United States Patent
Yoakum et al.

(10) Patent No.: US 6,735,621 B1
(45) Date of Patent: May 11, 2004

(54) METHOD AND APPARATUS FOR MESSAGING BETWEEN DISPARATE NETWORKS

(75) Inventors: John H. Yoakum, Cary, NC (US); James E. Reaves, Raleigh, NC (US); Paul D. Alluisi, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 662 days.

(21) Appl. No.: 09/638,580

(22) Filed: Aug. 15, 2000

Related U.S. Application Data

(60) Provisional application No. 60/183,389, filed on Feb. 18, 2000.

(51) Int. Cl.[7] .............................................. G06F 15/16
(52) U.S. Cl. ....................... 709/218; 709/232; 709/238; 709/249; 370/352; 370/401; 379/219; 379/220.01
(58) Field of Search ................................ 709/218, 206, 709/232, 238, 249; 370/353, 401, 352, 354; 379/93.07, 220.01, 219

(56) References Cited

U.S. PATENT DOCUMENTS

| | | | | |
|---|---|---|---|---|
| 5,966,431 A | * | 10/1999 | Reiman et al. | 379/115.01 |
| 5,974,449 A | * | 10/1999 | Chang et al. | 709/206 |
| 6,134,235 A | * | 10/2000 | Goldman et al. | 370/352 |
| 6,157,636 A | * | 12/2000 | Voit et al. | 370/353 |
| 6,157,648 A | * | 12/2000 | Voit et al. | 370/401 |
| 6,339,594 B1 | * | 1/2002 | Civanlar et al. | 370/352 |
| 6,373,817 B1 | * | 4/2002 | Kung et al. | 370/217 |
| 6,449,259 B1 | * | 9/2002 | Allain et al. | 370/253 |
| 6,529,524 B1 | * | 3/2003 | Liao et al. | 370/467 |
| 6,611,516 B1 | * | 8/2003 | Pirkola et al. | 370/352 |
| 6,693,729 B1 | * | 2/2004 | Bloomfield | 358/402 |
| 2002/0046286 A1 | * | 4/2002 | Caldwell et al. | 709/229 |

* cited by examiner

*Primary Examiner*—Frantz B. Jean
(74) *Attorney, Agent, or Firm*—Withrow & Terranova, PLLC

(57) ABSTRACT

Method and apparatus for messaging between disparate networks. A service control gateway (SCG) provides the capability to extend advanced intelligent network (AIN) services transparently between circuit switched and packet networks. In one embodiment, the invention works by translating signaling system 7 (SS7) transaction capabilities application part (TCAP) messages into session initiation protocol (SIP) INVITE messages. SIP messages, which may be responses to the translated messages referred to above, are translated back into TCAP messages. Data from messages is stored in an interaction database, a data structure maintained at the SCG. The SCG uses the interaction database to properly format translated messages for each network.

21 Claims, 5 Drawing Sheets

METHOD AND APPARATUS FOR MESSAGING BETWEEN DISPARATE NETWORKS

CROSS REFERENCE TO RELATED APPLICATION

This application claims priority from co-pending, commonly assigned, provisional application serial No. 60/183,389, entitled, "Implementing Advanced Intelligent Network (AIN) Services in Unified Networks Utilizing Session Initiation Protocol (SIP)," filed Feb. 18, 2000, which is incorporated herein by reference.

BACKGROUND

1. Field of the Invention

This invention relates to the translation of messages and responses being transferred between two different types of telecommunication networks. The messages are translated from the protocol of one network to the protocol of the other. More particularly, the invention relates to moving messages between a circuit-switched and a packet-based network. The invention is particularly useful to bridge the gap between an advanced intelligent network (AIN) and an internet protocol (IP) network that operates according to the session initiation protocol (SIP).

2. Description of the Problem

Evolution of the public switched telephone network (PSTN) has accelerated in recent years. Much of the PSTN still operates on circuit-switched connections. Integrated services digital network (ISDN) bearer channels often provide transport. In parallel with the PSTN, a packet based data network has evolved. This data network has largely been used for Internet traffic and data networking, and is mostly based in the internet protocol (IP). Although these networks have been mostly separate until recently, the two networks are starting to merge to create a so-called "unified network." It is likely that future growth, at least in the developed countries, will be mostly accommodated by growth in IP based, packet networks.

As the PSTN evolved, it became desirable to provide many new, intelligent services such as caller-ID, automated callback, call forwarding, local number portability, and other custom calling features. To enable this new network intelligence, signaling information messages between switches in the telephone network are exchanged on a separate physical circuit or channel dedicated to that purpose. To support a separate signaling path running throughout the telephone network, an advanced intelligent network (AIN) was developed which operates in parallel with the voice circuit network of the circuit-switched telephone system. Today, the AIN uses a messaging protocol called signaling system 7 (SS7) to exchange call information between switches. SS7 is based on a set of international standards for highspeed digital communications and serves as the foundation for telephony infrastructures worldwide. In SS7, a layer of the protocol called the Transaction Capabilities Application Part (TCAP) handles queries and responses for databases. Other layers of the protocol include Message Transfer Part 2 (MTP2) and Message Transfer Part 3 (MTP3), and the Signaling Connection Part (SCCP). The SS7 standards are well known. For further information see Telcordia Technologies, GR-246-CORE, *Specification of Signaling System Number 7, December,* 1999, which is incorporated herein by reference. The capabilities of SS7 have been extended by another layer, called Intelligent Network Application Protocol (INAP). A network which features this protocol is called an Intelligent Network (IN). INAP is described in European Telecommunication Standards Institute (ETSI) Publication, ETSI-CORE-INAP-CS2, *Intelligent Network Application Protocol, Capability Set* 2, March, 1996, which is incorporated herein by reference.

Reliable, flexible, multimedia and voice traffic over IP networks has been enabled by the Session Initiation Protocol (SIP) as described in Internet Engineering Task Force (IETF) Request for Comments (RFC) 2543: *Session Initiation Protocol*, March 1999, which is incorporated herein by reference. SIP is an application layer control protocol that is used to establish, modify, and terminate multimedia sessions or calls. SIP provides proxiable messages used to perform call setup, modification, and termination functions. For example, one SIP message used to perform call setup functions is the INVITE message. The INVITE message is conventionally used to invite telephony devices to participate in a media stream communication, such as a voice communication, a data communication, a video communication, or any combination thereof. The INVITE message includes a session description protocol (SDP) portion that is used by end user devices to exchange media capabilities and other information.

As unified networks emerge, it is becoming increasingly important to provide calling services seamlessly across SIP based packet, networks and traditional AIN based signaling networks. In fact, this capability will become critical, as eventually, some new services will be provisioned only in the SIP based network. It will be desirable to access those services from the AIN based network, which will still be used for some time. The equipment and related protocols used to provide traditional AIN services are not readily adaptable to packet telephony networks. Currently, a few services have been provided across networks by using large, standing, centralized data-bases that slow down the routing of messages considerably. What is needed is a way to allow calling services to span cooperating circuit switched and packet switched networks, by seamlessly translating messages and responses between TCAP and SIP in a distributed manner, and in substantially real time.

SUMMARY

The present invention solves the above problem by providing the capability to extend AIN services transparently between circuit switched and packet networks in a distributed fashion. Because the invention simplifies the provision of services that span the different network architectures, the services do not have to be fully deployed in multiple networks, and can therefore be deployed at lower cost. In one embodiment, the invention works by translating TCAP messages into SIP messages at each connection point between the two networks. SIP messages, which may be responses to the translated messages referred to above, are translated back into TCAP messages as appropriate. The proxy capability of SIP is used in conjunction with timers and default database entries to assure the circuit-switched network receives timely responses. It should be noted that any messages being handled will generically be referred to herein as "messages." However, the term "response" specifically refers herein to a message originating in one network in response to a message originating in another network.

According to an embodiment of the invention, a service control gate-way (SCG) is provided to translate messages being passed between the two networks. When the SCG receives a message from a first network, it stores network specific data from the message in an interaction database. The interaction database is a data structure maintained at the SCG to store information pertaining to a message as it traverses the unified network. The SCG determines network specific data for the second network that corresponds to the network specific data for the first network and stores that data in the interaction database. The message is then sent to a second network using the second network specific data so that the message is properly formatted. A response is received from the second network and is associated with the original message using information in the interaction database. The response is then formatted for the first network and sent to the first network for processing. In one embodiment, the first network is a circuit switched, AIN network using the SS7 protocol, and the second network is a packet network using SIP.

The interaction database, as referenced above, can be maintained within the memory system of the SCG. The database enables the fast translation of TCAP messages into SIP messages, and vice versa. The interaction database includes AIN network specific information, including a transaction identifier, session parameters, and routing data, corresponding to a message. The interaction database also includes SIP network specific information, including a call identifier and a sequence number corresponding to the message. All of the network specific information is accessible by a computer program that enables the service control gateway to translate messages and responses so that they can be passed between the two networks. In one embodiment, the information in the interaction database is organized into interaction data units (IDU's). Information in the database is created as needed, maintained until the transaction is completed, and then erased. Multiple SCG's can be used, one at each connection point between the networks, effectively distributing interaction databases across the IP network entry points. This distributed database structure, together with the capability to maintain only data needed for current transactions, makes the translation provided by the SCG's much faster and more efficient than would be possible with a standing, centralized database.

The service control gateway is a hardware platform that includes connections for the two or more networks being spanned, and one or more processor units that control the operation of the SCG. The processors access a memory system, which includes the computer program code that implements the method of the invention, as well as the interaction database described above. The software and hardware in the SCG also provide a default response to the AIN if a message times out or a response cannot be sent from the packet network. The SCG is deployed between two constituent networks, a circuit switched network and the SIP based, packet switched network. The SIP network preferably includes a number server which can proxy INVITE messages for other entities within the SIP based constituent network.

As previously mentioned many aspects of the invention are implemented by computer program code. The computer program code together with the hardware described above provides the means to perform the functions of the universal mediation point. The computer program code can be stored independently from the device or transported over a network for shipping, back-up, or archival purposes. If the code is stored, storage media is used. The media can be magnetic such as diskette, tape, or fixed disk, or optical such as a CD-ROM.

DETAILED DESCRIPTION OF ONE OR MORE EMBODIMENTS

The architecture of the present invention provides for the spanning of circuit-switched and packet networks with the provision of various calling services. In the embodiments described, the SIP protocol is used on the packet side. The SIP protocol enables the invention to manage calls in a wide range of networks, since SIP service logic can provide services to multiple networks. Furthermore, the invention does not require any changes to existing protocols or network nodes within the spanned networks except for simple reconfigurations. The architecture of the invention has not been designed to support merely a few pinpointed services. Rather, the invention defines a more generic approach. The scope of services that the invention enables includes any services that execute before an end-to-end media session is established, as well as some services that involve IN-SIP messaging during an established media session to affect the media session in progress. Additionally, the server can include a multitude of interactive sessions involving call centers that reroute calls in progress and billing functions that disconnect calls once limits have been reached. These services include most services that redirect calls, announce pending calls, filter incoming calls, or select termination points.

Figure 1:
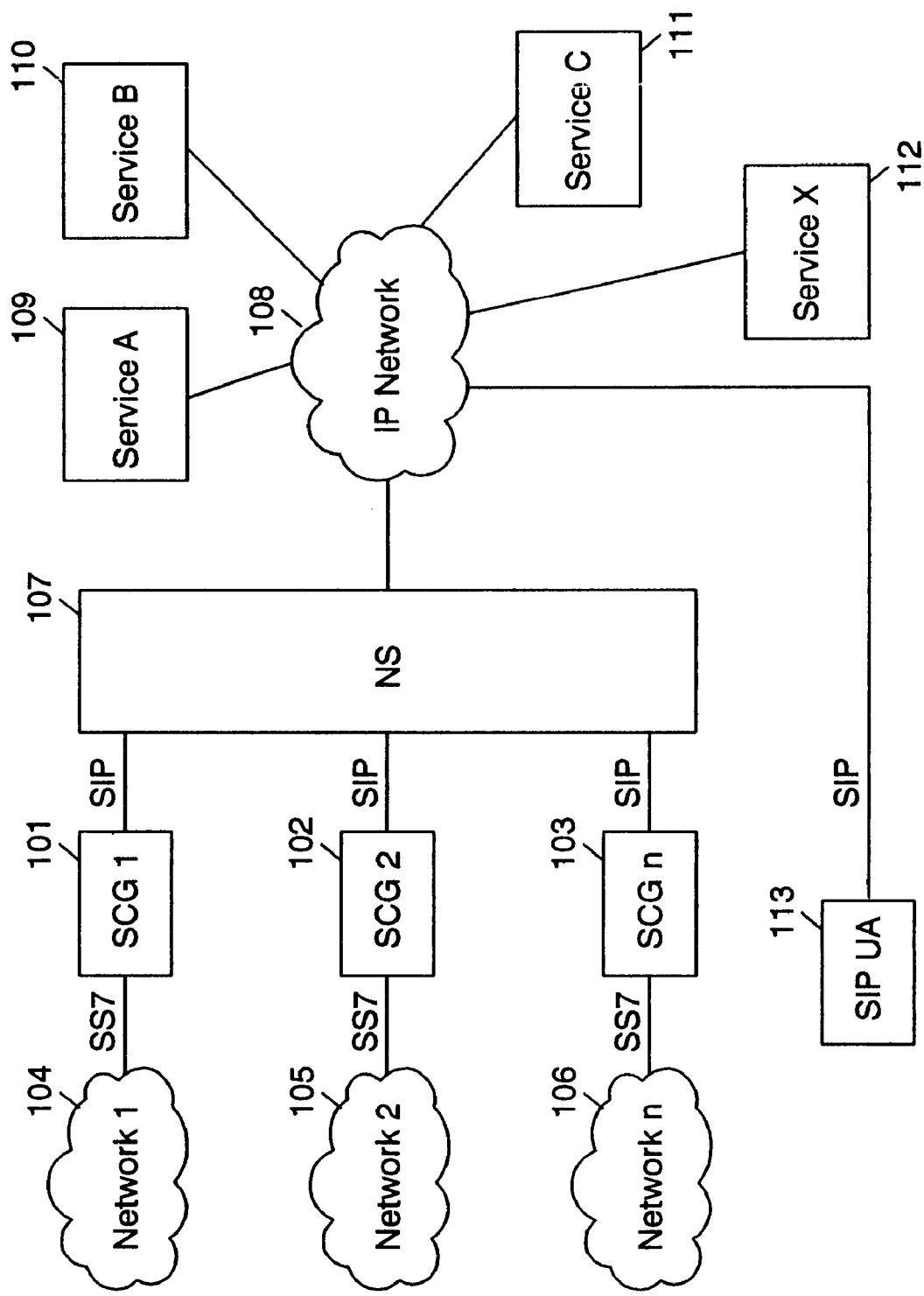
FIG. 1 is a network diagram showing the operating environment of the present invention.

FIG. 1 illustrates the network environment of the invention. Network 1, 104, network 2, 105, and network N, 106, are traditional, PSTN, circuit-switched networks. These networks provide services using SS7 protocols. As indicated by the labeling "network N" shown on network 106, any number of circuit-switched networks can be interconnected to the SIP-based packet network of the invention. This packet network, 108, is IP-based and services are provided with the SIP protocol. Any number of services can be included in the IP network. In this example, service A, 109, service B, 110, service C, 111, and service X, 112, are provided in the network. These services are directly accessible by SIP user agent (UA) 113. However, if it were not for the present invention, these services would not be accessible to users of circuit-switched networks 104, 105, and 106.

According to FIG. 1, each circuit-switched network is interconnected with the IP network through a service control gateway (SCG). SCG 1, 101, serves network 104. SCG 2, 102, serves network 105. SCG N, 103, serves network 106. The SCG's according to the invention provide high-speed TCAP-to-SIP translation and SIP-to-TCAP translation in a distributed, high-speed, real-time manner. It should be noted that, in order to expand the range of services that can be provided, a number server (NS), 107, is provided as the entry-point to the IP network. While it might be possible to provide some services without the number server, it is normally necessary to map traditional telephone numbers into SIP addresses on the IP side of the unified network. International assignments for telephone numbers are specified in International Telecommunications Union (ITU) "T" Recommendation E.164, adopted May, 1997, which is incorporated herein by reference. Number server 107 replaces the called E.164 number with a new E.164 number (which can be the same as the original called number) based on the database contents or proxy results. The number server 107 can proxy messages to other SIP nodes which can convert the E.164 number to a nonnumeric SIP address for use in the IP network. Since the current PSTN only operates on numerical addresses, the number server receives or converts all called party addresses to numerical values prior to sending them back into the PSTN network.

Figure 2:
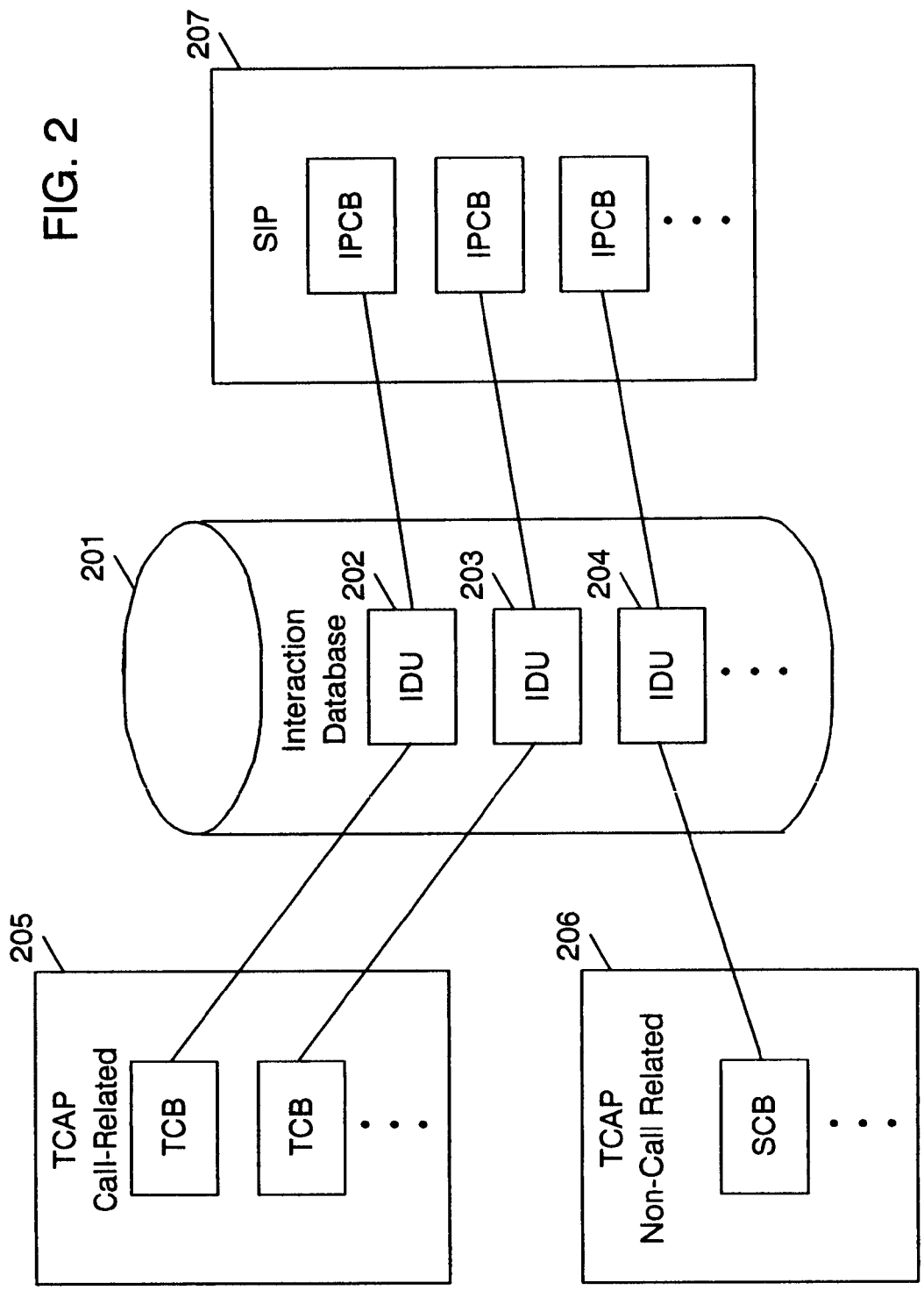
FIG. 2 is a block diagram illustrating the data structure that is maintained by a service control gateway according to the present invention.

FIG. 2 illustrates the structure of the interaction database maintained at the SCG of the present invention. Interaction database 201 is maintained in the memory of the SCG. The software program that operates the SCG includes logic 205 to handle TCAP call-related messages. This software logic extracts specific network-information from a message and stores it in a TCAP control block (TCB). Information from the TCAP control block is stored in an interaction data unit (IDU) within the interaction database. Similarly, TCAP non-call related logic 206, within the software program, extracts specific network information from non-call related messages. This information is temporarily stored in a signaling connection control part (SCCP) block (SCB). The information is subsequently stored in the interaction database in one of the interaction data units, 202, 203, or 204. Logic within the software program of the SCG responsible for SIP messaging, 207, accesses information in an IDU within the interaction database, 201, to determine network-specific information for a SIP message. This network specific information is stored in an Internet protocol control block (IPCB). It should be noted that the creation, conversion, maintenance, and destruction of the interaction data units and the various control blocks, used to convert messages, are dynamic. The software within the SCG, and the interaction database, 201, only maintains information, which is required for messaging currently in process. There is one IDU per transaction or conversation. An IDU references the IPCB for the SIP data and either the TCB or the SCP for the AIN data, depending on whether the AIN message was a call related message or a non-call related message.

Figure 3:
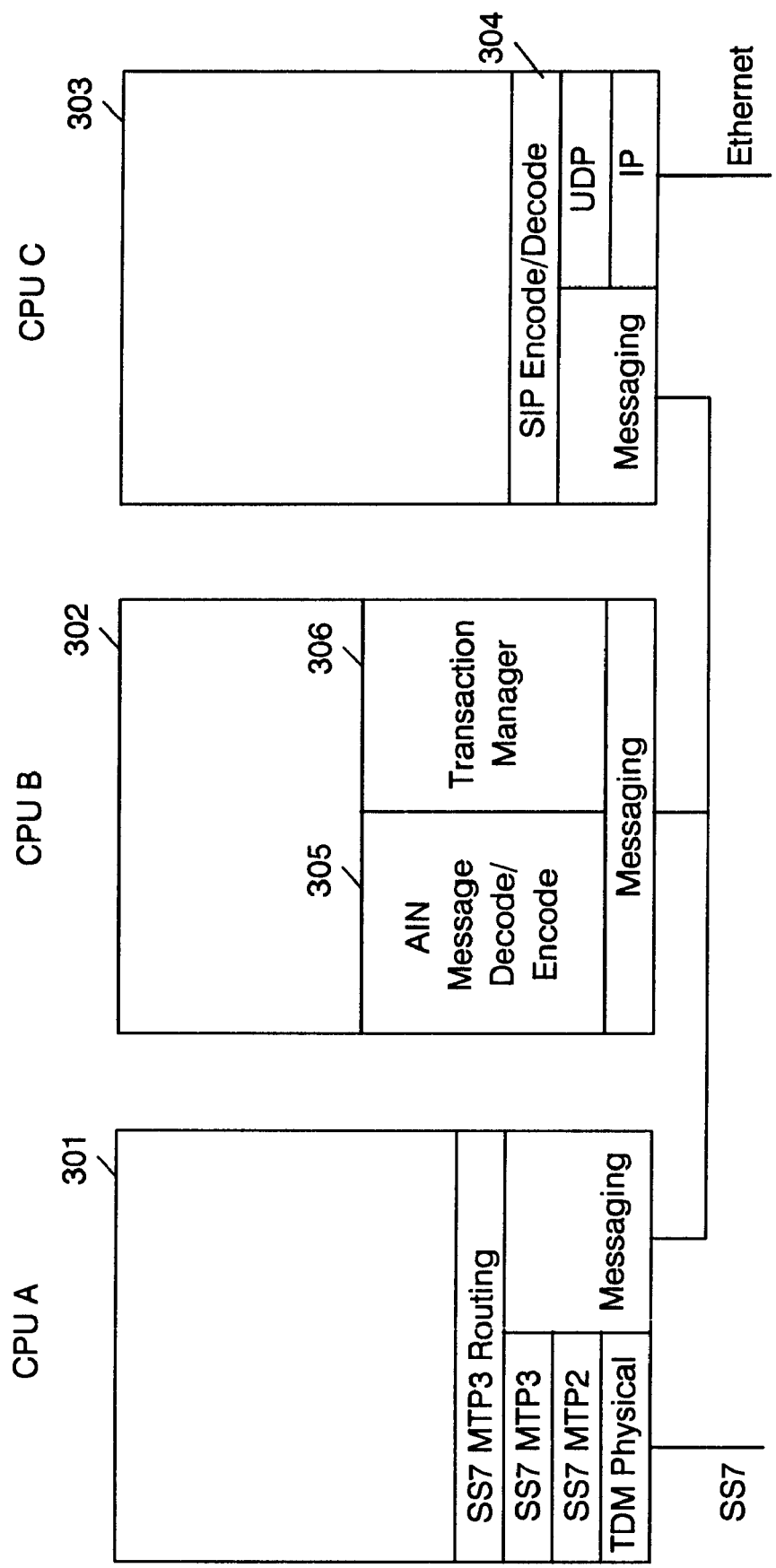
FIG. 3 shows a flowchart that illustrates the method of the present invention.

FIG. 3 illustrates an example architecture that can be used to implement the service control gateway of the present invention. In FIG. 3, three central processing units, CPU A, CPU B, and CPU C work together to carry out the various functions required to implement the invention. The CPU's are connected by an internal messaging system. This may be an internal asynchronous transfer mode (ATM) system, an internal IP or other packet transport system, or it may be a high-speed bus. Each CPU executes computer program code to implement specific functions required by the invention.

CPU A, 301, maintains the various SS7 layers. CPU A also maintains the physical layer, which interfaces to the SS7 network. CPU B, 302, maintains AIN message encoding and decoding logic, 305, and the transaction manager, 306. The transaction manager manages access to the interaction database according to the invention. CPU C, 303, provides SIP encoding and decoding with software logic 304. CPU C also provides Internet protocol connectivity via an Ethernet connection and a uniform datagram protocol (UDP) layer, which serves as the transport layer for the SIP network. It should be noted that this particular implementation, that is, an implementation using three CPU subsystems, is shown by way of example only. It is possible to implement the invention with one, or any number of cooperating CPU's performing all of the logical functions.

The architecture of FIG. 3 maintains services as if all communication was based on IP and all clients and servers were SIP enabled. The SCG as described above converts network-specific call control signaling to SIP messages and vice-versa. The SCG behaves as a regular SIP user agent (UA) toward the services. The SCG also behaves as a network-specific service control node in the network where the call is being set up. The SCG as described above not only handles protocol conversions but also address translation. The service control gateway could also be designed to access services in the SS7 network from the SIP network.

The SCG as described above resends INVITE messages every timing interval on the IP side if no response is received. The service control gate-way cancels the INVITE attempt if no provisional response is received within a certain time-out interval, to be selected by the service provider, or designer. The service control gateway according to the above architecture behaves as a service control point (SCP) in the SS7 network and maintains enough state information on all proxied SIP invites so that it can respond to the circuit-switched network with a default response extracted from its own database if necessary. The default response can also be supplied from the number server if no database exists in the SCG. The service control gate-way also has a built-in firewall to isolate and protect both the networks. The default response is sent after a specified time-out interval, as tracked by an available timer, has elapsed.

Figure 4:
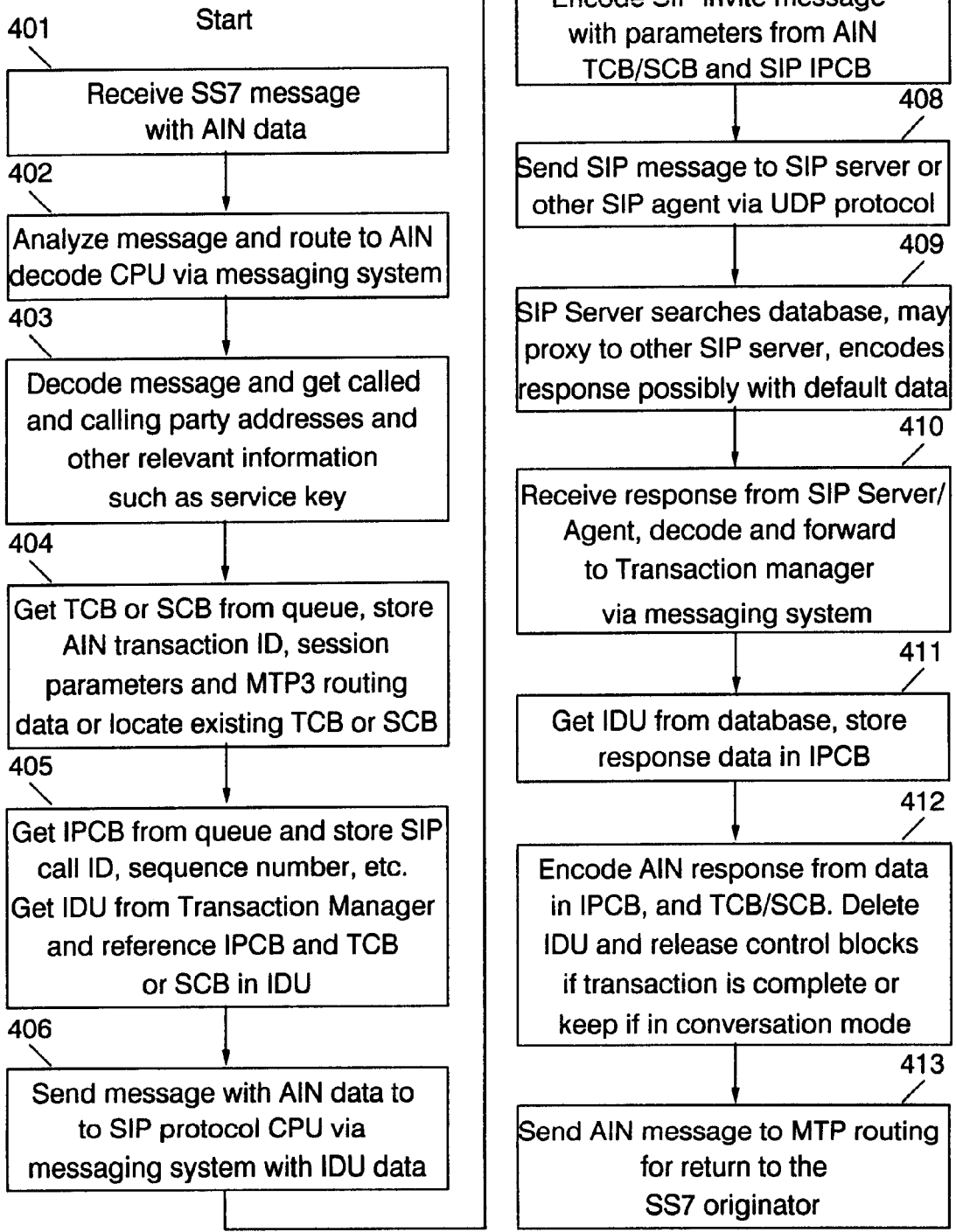
FIG. 4 is a conceptual block diagram which illustrates the protocol stack organization relative to the CPU hardware of the present invention as implemented in the service control gateway of the present invention.

FIG. 4 illustrates a flow chart which describes the method executed by the service control gateway to implement the present invention when a service within the IP network is accessed by a caller in the SS7 network. At step 401 the SS7 message, containing AIN data, is received at the gateway. At step 402 the message is analyzed in CPU A and routed to CPU B over the internal messaging system. At step 403 the message is decoded and the called and calling party addresses are retrieved from the message. Other relevant information, such as a service key, is also retrieved. At step 404, a TCAP control block (TCB) is retrieved from an empty queue for call-related messages or a SCCP control block (SCB) is retrieved for non call related messages. The TCB or SCB may be retrieved from an active queue if these messages are part of an AIN conversation. The AIN transaction ID, session parameters and MTP3 routing data, etc., is stored in the control block.

After determining the appropriate corresponding network information for the SIP network, the gateway stores the data, including the call ID and sequence number, in a SIP IP control block (IPCB). An IDU is retrieved from the Transaction Manager and references to the TCB/SCB and IPCB are placed in the IDU to reference the AIN/SIP interaction at step 405. At step 406, the message is sent to the SIP protocol CPU, CPU C of FIG. 3 with data from the IDU. A SIP INVITE message with appropriate parameters is encoded at step 407. The SIP message is sent at step 408.

At step 409 the message is received by a SIP server (the number server) and processed. If no database record is found the message can be optionally proxied to another SIP server or servers until a record is found. If an error occurs in the network of SIP servers, the first server returns a default response after a specified timeout period to insure a correct and timely response to the PSTN based network via the SS7 protocol. At step 410 of FIG. 4, a response from the appropriate SIP server or agent is received, decoded, and sent to the transaction manager via the internal messaging system. At 411 the IDU is retrieved from the interaction database and the response data is stored in the IPCB. At step 412, an AIN response is encoded using the data in the TCB/SCB and IPCB as referenced by the IDU. If the transaction is complete, the IDU and TCB/SCB/IPCB are deleted. If the various entities involved in the transaction are in conversation mode, that is, the transaction is continuing, the IDU and TCB/SCB/IPCB are retained until the conversation is complete or times out. Finally, at step 413, an AIN message which has been encoded, is sent to the MTP3 routing layer of CPU A in FIG. 3, processed, and returned to the originator over the SS7 network.

Figure 5:
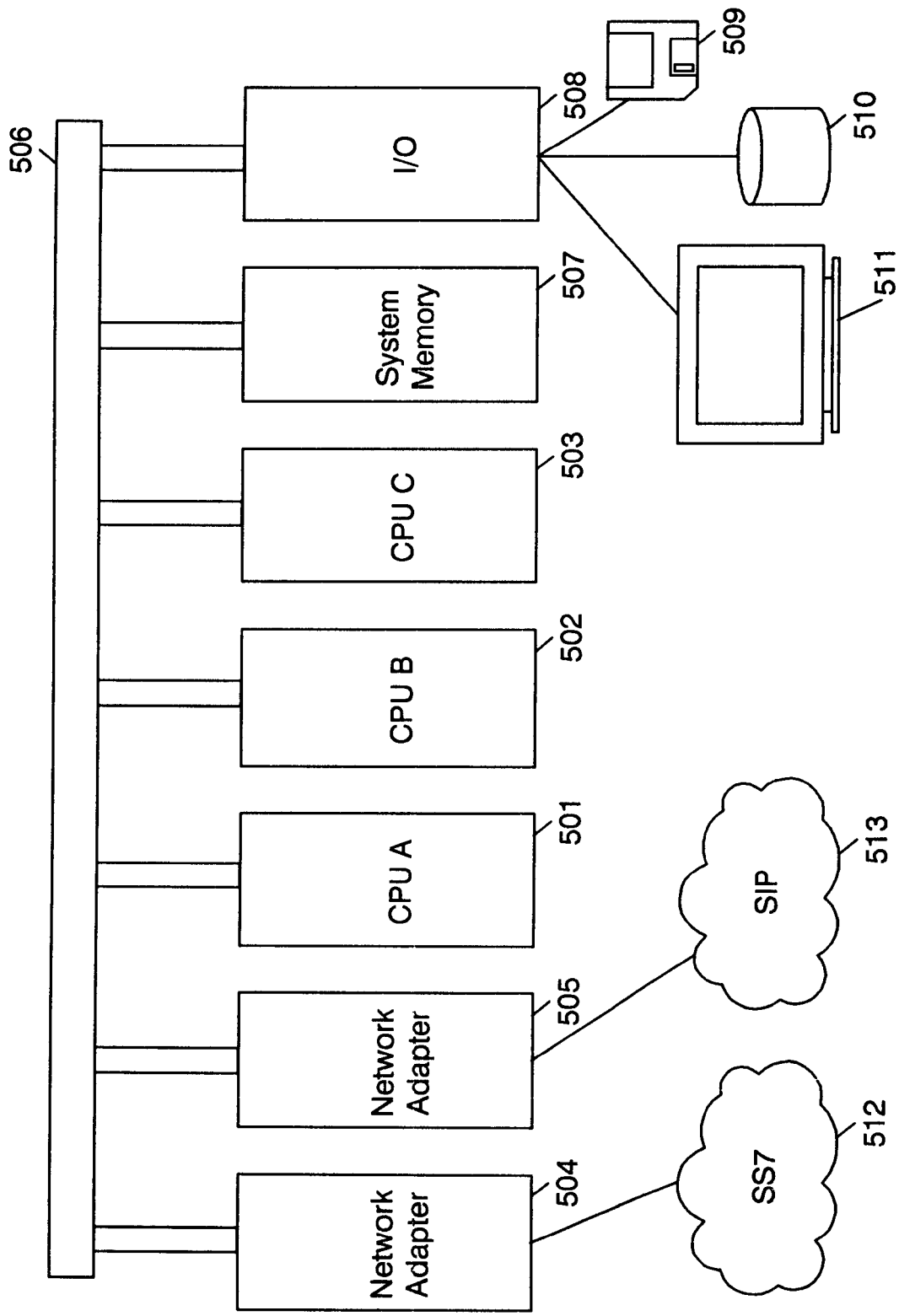
FIG. 5 is a block diagram showing the hardware design of the service control gateway of the present invention.

FIG. 5 is a block diagram illustrating the hardware configuration of the service control gateway of the present invention. In FIG. 5, CPU A, CPU B, and CPU C, as illustrated in FIG. 3, are implemented on circuit cards 501, 502, and 503, respectively. These circuit cards are connected to messaging system 506, physically, a bus within a hardware frame. System memory 507 can be physically located on a separate circuit card or distributed on the CPU boards. Network adapter 505 interfaces to SIP network 513. In the preferred embodiment, this interface is via a 100base-T Ethernet connection. Preferably, two Ethernet cards are used to implement the connection. If the primary Ethernet link goes down, an automatic switchover to the second link is provided. Network adapter 504 provides connectivity to the SS7 network, 512. Again, this network adapter is preferably provided in duplicate. Input/output (I/O) hardware 508 provides connections for a user terminal, 511, fixed storage, 510, and a removable media device, graphically illustrated as a diskette indicating a diskette drive at 509. In reality, the I/O hardware can be provided in one circuit card or many circuit cards. The removable media device can be a diskette drive, CD-ROM, tape drive, or any other type of removable media drive. All of the hardware in the service control gateway communicates via messaging system 506.

As previously mentioned, appropriate computer program code in combination with the hardware of FIG. 5 implements most of the elements of the invention. This computer program code is often stored on storage media. This media can be a diskette, hard disk, CD-ROM, DVD-ROM, or tape. However, the media can also be a memory storage device or collection of memory storage devices such as read-only memory (ROM) or random access memory (RAM). Additionally, the computer code can be transferred to the workstation over the Internet or some other type of network. As an example, consider a diskette, as used to indicate the removable media in FIG. 5. In a diskette, a magnetic media is enclosed in a protective jacket. Magnetic field changes over the surface of the magnetic media are used to encode computer program code. A computer readable magnetic tape cassette works in a similar fashion. Optical media, such as a CD-ROM or DVD-ROM, consists of a metallic substrate encased in plastic. Indentations in the metallic substrate are used to encode the computer program code. These indentations can then be scanned by a LASER in order to retrieve the program code and load the code into the service control gateway.

As an example of the use of the service control gateway of the present invention, consider a conventional number portability implementation in a mobile circuit-switched network. Previously, such a circuit-switched network used INAP messages to carry number queries to a network internal, centralized database. Using the invention, however, an SCG and a high-performance SIP redirect server, a number server as referred to previously, can replace the database application which previously would have been housed in a service control point (SCP). The INAP message carrying the number portability query is converted to a SIP INVITE message by the SCG and is then forwarded to the number server. If the called number is not registered, then the number server will return a "not-found" message. The SCG interprets this as a "non-ported number" message and returns a connect message to the circuit-switched network, causing the network to complete the connection to the called number.

In the case of a ported number, the number is registered. In this case, the number server will return a "moved permanently" message with a telephone uniform resource locator (URL) in the contact field. The SCG then returns a connect message to the circuit switched network, causing the network to connect the call to the number that was conveyed in the contact field.

If the number server previously described operates in proxy mode for selected numbers, then the server will become a kind of service router, able to proxy number queries to any SIP redirect server anywhere in the IP network. Consider the provision of a personal call filtering service hosted by a user's desktop personal computer. The INAP message is converted to an INVITE message by the service control gateway and then forwarded to the number server as before. However, in this case, the number is registered with a reference to a SIP URL. The number server proxies the INVITE message, to the registered URL, which is the address of the filtering service.

The service responds as if it were another SIP redirect server and the service logic determines the response. The number server proxies the response back to the SCG, which converts the response to an appropriate INAP message. The response is typically a "moved temporarily" message with a telephone number in the contact field. If the service user can be reached via several different addresses, then all of them should be added to the response by means of multiple contact fields. The SCG then selects an address that is valid for the node or application that issued that number query.

We have described specific embodiments of our invention, which provides a method for translating service-related messages so that services can be provided across disparate networks. One of ordinary skill in the networking and computing arts will quickly recognize that the invention has other embodiments. In fact, many implementations are possible. The following claims are in no way intended to limit the scope of the invention to the specific embodiments described.

We claim:

1. A method of messaging between disparate networks comprising:
   receiving a signaling information message from a first network;
   storing first network specific information from the signaling information message in an interaction database;
   determining second network specific information corresponding to the first network specific information and storing the second network specific information in the interaction database;
   sending the signaling information message to a second network using the second network specific information;
   receiving a response from the second network;
   associating the response with the signaling information message by referencing the interaction database; and
   sending the response to the first network using the first network specific information.

2. The method of claim 1 wherein the first network is a circuit-switched network and the second network is a packet-switched network.

3. The method of claim 2 wherein the signaling information message is received formatted according to a signaling system 7 (SS7) protocol and the response is received formatted according to a session initiation protocol (SIP).

4. A computer program product for messaging between disparate networks, the computer program product including a media with a computer program embodied thereon, the computer program comprising:
  computer program code for receiving a signaling information message from a first network;
  computer program code for storing first network specific information from the signaling information message in an interaction database;
  computer program code for determining second network specific information corresponding to the first network specific information and storing the second network specific information in the interaction database;
  computer program code for sending the signaling information message to a second network using the second network specific information;
  computer program code for receiving a response from the second network;
  computer program code for associating the response with the signaling information message by referencing the interaction database; and
  computer program code for sending the response to the first network using the first network specific information.

5. The computer program product of claim 4 wherein the first network is a circuit-switched network and the second network is a packet-switched network.

6. The computer program product of claim 5 wherein the signaling information message is received formatted according to a signaling system 7 (SS7) protocol and the response is received formatted according to a session initiation protocol (SIP).

7. Apparatus for messaging between disparate networks comprising:
  means for receiving a signaling information message from a first network;
  means for storing first network specific information from the signaling information message in an interaction database;
  means for determining second network specific information corresponding to the first network specific information and storing the second network specific information in the interaction database;
  means for sending the signaling information message to a second network using the second network specific information;
  means for receiving a response from the second network;
  means for associating the response with the signaling information message by referencing the interaction database; and
  means for sending the response to the first network using the first network specific information.

8. A computer readable memory system encoded with an interaction database, the interaction database containing:
  first network specific information derived from a signaling information message sent by a first network; and
  second network specific information corresponding to the signaling information message, wherein the first network specific information and the second network specific information are accessible by a computer program that enables a service control gateway to pass signaling information messages and responses between the first network and a second network.

9. The computer readable memory system of claim 8 wherein the first network specific information and the second network specific information are stored in one or more interaction data units.

10. A service control gateway that enables messages related to telecommunication services to be processed across disparate networks by performing the steps of:
  receiving a signaling information message from a first network;
  storing first network specific information from the signaling information message in an interaction database;
  determining second network specific information corresponding to the first network specific information and storing the second network specific information in the interaction database;
  sending the signaling information message to a second network using the second network specific information;
  receiving a response from the second network;
  associating the response with the signaling information message by referencing the interaction database; and
  sending the response to the first network using the first network specific information.

11. The service control gateway of claim 10 wherein the first network is a circuit-switched network and the second network is a packet-switched network.

12. The service control gateway of claim 11 wherein the signaling information message is received formatted according to a signaling system 7 (SS7) protocol and the response is received formatted according to a session initiation protocol (SIP).

13. The service control gateway of claim 12 wherein the first network specific information includes information selected from the group consisting of: a transaction identifier, session parameters, and routing data, and the second network specific information includes information selected from the group consisting of: a call identifier and a sequence number.

14. A service control gateway that enables telecommunication services to be provided across disparate networks, the service control gateway comprising:
  connections for a first network and a second network;
  one or more processors for controlling the operation of the service access gateway; and
  a computer readable memory system connected to the one or more processors, the computer readable memory system operable to maintain an interaction database for storing first network specific information derived form a signaling information message sent by the first network, and second network specific information corresponding to the signaling information message, wherein the first network specific information and the second network specific information are accessible by the one or more processors under the control of a computer program so that the signaling information message can be transferred between the first network and the second network.

15. The service control gateway of claim 14 wherein the first network is a circuit-switched network and the second network is a packet-switched network.

16. The service control gateway of claim 15 wherein the signaling information message is received formatted according to a signaling system 7 (SS7) protocol and the response is received formatted according to a session initiation protocol (SIP).

17. The service control gateway of claim 16 wherein the first network specific information includes information selected from the group consisting of: a transaction identifier, session parameters, and routing data, and the second network specific information includes information selected from the group consisting of: a call identifier and a sequence number.

18. A system for interconnecting two or more disparate constituent networks, the system comprising:

packet-based constituent network apparatus including a number server that is operable as a proxy for packet-based network servers; and a service control gateway having connections for a circuit-switched constituent network, and being connected to the packet-based constituent network apparatus, the service control gateway including a computer readable memory system operable for storing an interaction database including circuit-switched and packet-based network specific information corresponding to a signaling information message, wherein the circuit-switched and packet-based network specific information is accessible by one or more processors under the control of a computer program so that the signaling information message can be transferred amongst the two or more disparate constituent networks.

19. The system of claim 18 wherein the service control gateway is further operable to return a default response to the message from a database.

20. The system of claim 19 wherein the database is stored in the service control gateway.

21. The system of claim 19 wherein the database is stored in the packet-based constituent network apparatus.

* * * * *